United States Patent
Lin et al.

(10) Patent No.: US 8,130,831 B2
(45) Date of Patent: *Mar. 6, 2012

(54) TWO-LAYER ENCODING FOR HYBRID HIGH-DEFINITION DVD

(75) Inventors: Shu Lin, Indianapolis, IN (US); Mary Lafuze Comer, Fairmount, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1682 days.

This patent is subject to a terminal disclaimer.

(21) Appl. No.: 10/535,880

(22) PCT Filed: Oct. 27, 2003

(86) PCT No.: PCT/US03/33871
§ 371 (c)(1),
(2), (4) Date: May 20, 2005

(87) PCT Pub. No.: WO2004/049732
PCT Pub. Date: Jun. 10, 2004

(65) Prior Publication Data
US 2006/0062295 A1    Mar. 23, 2006

Related U.S. Application Data

(60) Provisional application No. 60/428,853, filed on Nov. 25, 2002.

(51) Int. Cl.
*H04N 7/12* (2006.01)
(52) U.S. Cl. .................................. 375/240.11; 375/360
(58) Field of Classification Search ............. 375/240.11, 375/360
See application file for complete search history.

(56) References Cited

U.S. PATENT DOCUMENTS

| | | | |
|---|---|---|---|
| 5,515,377 | A | 5/1996 | Horne et al. |
| 5,923,869 | A | 7/1999 | Kashiwagi et al. |
| 6,057,884 | A | 5/2000 | Chen et al. |
| 6,233,356 | B1 | 5/2001 | Haskell et al. |
| 6,292,512 | B1 | 9/2001 | Radha et al. |
| 6,510,177 | B1 | 1/2003 | De Bonet et al. |

(Continued)

FOREIGN PATENT DOCUMENTS

EP     0883300 A2    12/1998

(Continued)

OTHER PUBLICATIONS

Search Report Dated Mar. 25, 2004.
Supplementary European Search Report dated Apr. 1, 2011.

*Primary Examiner* — Jay Patel
*Assistant Examiner* — James Pontius
(74) *Attorney, Agent, or Firm* — Robert D. Shedd; Paul P. Kiel; Guy H. Eriksen

(57) ABSTRACT

A hybrid high-definition encoder and method are disclosed, for processing signal data as a plurality of block transform coefficients for each of base layer data and enhancement layer data, where the encoder includes a two-layer decomposition unit for decomposing an original high-definition signal data sequence into base layer data and enhancement layer data, a standard-definition encoder coupled to the decomposition unit for encoding the base layer data as a base layer bitstream embodying a standard-definition data sequence, and a high-definition encoder coupled to the decomposition unit and the standard-definition encoder for encoding only the difference between the high-definition data and the standard-definition data as base layer picture user data embodying a high-definition data sequence.

22 Claims, 3 Drawing Sheets

U.S. PATENT DOCUMENTS

| | | |
|---|---|---|
| 6,614,936 B1 | 9/2003 | Wu et al. |
| 6,658,157 B1 | 12/2003 | Satoh et al. |
| 6,970,938 B2 * | 11/2005 | Sugiyama et al. ............ 709/231 |
| 7,133,449 B2 * | 11/2006 | Chen .......................... 375/240.1 |
| 7,146,056 B2 | 12/2006 | Gunnewiek et al. |
| 2001/0038746 A1 * | 11/2001 | Hughes et al. ................ 386/123 |

FOREIGN PATENT DOCUMENTS

| | | |
|---|---|---|
| EP | 1094674 A2 | 4/2001 |
| JP | 10210410 A | 8/1998 |
| JP | 11150706 A | 6/1999 |
| JP | 2002-524985 A | 8/2002 |
| WO | 0014967 A1 | 3/2000 |

* cited by examiner

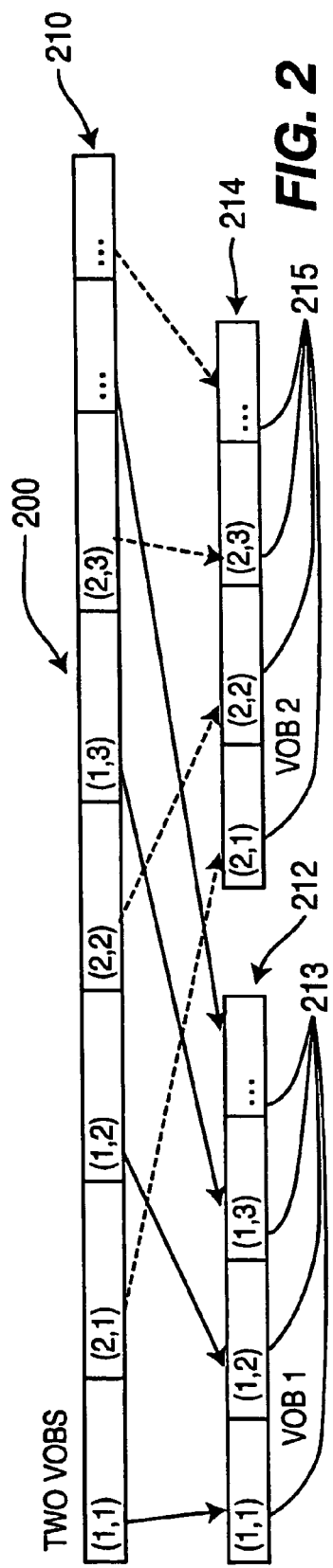

FIG. 2

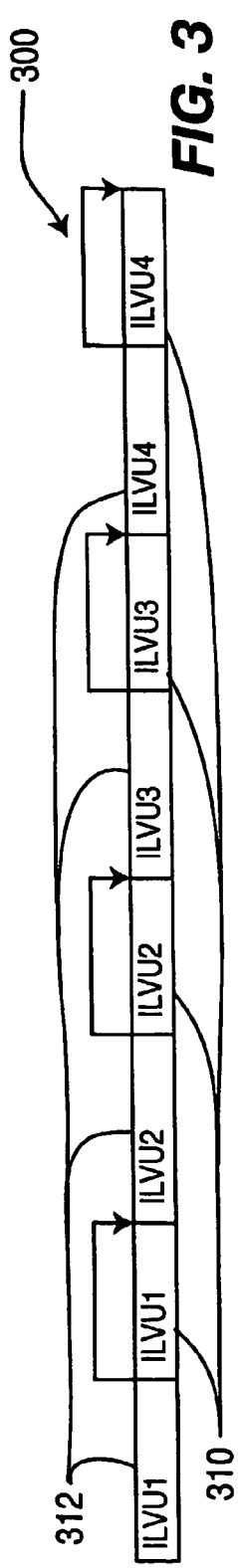

FIG. 3

| SECTOR # | DATA |
|---|---|
| 1 TO i | SEQUENCE HEADER, GOP HEADER, PICTURE HEADER WITHOUT USER DATA, PLUS PADDING DATA |
| i+1 TO j | FIRST PICTURE ENHANCEMENT LAYER DATA PLUS PADDING DATA (PICTURE USER DATA) |
| j+1 TO n | FIRST PICTURE BASE LAYER DATA PLUS PADDING DATA |
| n+1 TO m | SECOND PICTURE HEADER WITHOUT USER DATA PLUS PADDING DATA |
| m+1 TO k | SECOND PICTURE ENHANCEMENT LAYER DATA PLUS PADDING DATA (PICTURE USER DATA) |
| k+1 TO L | SECOND PICTURE BASE LAYER DATA PLUS PADDING DATA |
| ... | |

FIG. 4

TWO-LAYER ENCODING FOR HYBRID HIGH-DEFINITION DVD

CROSS-REFERENCE TO RELATED APPLICATION

This application claims the benefit, under 35 U.S.C. §365 of International Application PCT/US03/33871, filed Oct. 27, 2003, which was published in accordance with PCT Article 21(2) on Jun. 10, 2004 in English and which claims the benefit of U.S. provisional patent application No. 60/428,853, filed Nov. 25, 2002. Furthermore, this application is closely related to U.S. application Ser. No. 10/535,778, filed May 20, 2005 and entitled "TWO-LAYER DECODING FOR HYBRID HIGH-DEFINITION DVD".

FIELD OF THE INVENTION

The present invention is directed towards video encoders, and in particular, towards video encoders for integrating standard-definition and high-definition versions of video data on a single digital videodisc.

BACKGROUND OF THE INVENTION

Video data is generally processed in the form of bit streams by video encoders and decoders (collectively "CODECs"), and stored on digital videodisc ("DVD") media. There is a substantial installed user base of red laser DVD players using MPEG-2 decoders. Red laser devices used with MPEG-2 encoding result in storage capacities sufficient to support standard-definition ("SD") versions of typical movies, while there is great interest in supporting high-definition ("HD") versions of these movies on the same disc. Unfortunately, the installed user base of red laser players used with MPEG-2 support a storage capacity insufficient for holding both SD and HD versions of typical movies.

Red laser and blue laser technologies have both been considered for reaching storage capacities sufficient to support high-definition recordings ("HD-DVD"). The blue laser technology has the advantage of providing sufficient storage to hold multiple high-quality HD movies on one disc using MPEG-2, but it is not yet economically feasible to use blue lasers to supplant the installed user base of red laser devices. Hence, there is a need for a coding scheme usable for HD-DVD that can also support SD-DVD on the same disc readable by current red laser devices using MPEG-2 decoders.

Thus, with red laser HD-DVD, it is desirable to store on a single disc, in addition to the HD version, an SD version of a movie that can be read by a current player having an MPEG-2 decoder. This would mean that content creators would not need to make a separate HD-DVD disc in addition to the SD disc, and retailers would need to stock only one disc per movie, using just one stock keeping unit ("SKU"). This may avoid problems such as those encountered with broadcast high-definition television ("HDTV"), where broadcasters did not want to transmit HD until more HD sets were sold, but consumers did not want to buy HD sets until there was more HD content available.

The present invention assumes the use of single-sided storage media. While double-sided discs are an option for obtaining more storage, there is some resistance to using both sides of the disc. This is due, in part, to the disadvantages of increased cost and the fact that storing content on both sides interferes with the labeling that is normally put on one side of a disc. Accordingly, the approaches for HD-DVD of (i) blue laser technology; (ii) double-sided red laser discs; and (iii) separate red laser discs for HD and SD versions of a movie; each have significant drawbacks and disadvantages.

SUMMARY OF THE INVENTION

These and other drawbacks and disadvantages of the prior art are addressed by an apparatus and method for hybrid high-definition ("HD") video encoding and format for storing such signal information on a digital videodisc.

A hybrid high-definition encoder stores signal data as a plurality of block transform coefficients for each of a base layer and an enhancement layer, where the encoder includes a two-layer decomposition unit for decomposing an original high-definition signal data sequence into base layer data and enhancement layer data, a standard-definition ("SD") encoder coupled to the decomposition unit for encoding the base layer data as a base layer bitstream embodying a standard-definition data sequence, and a high-definition encoder coupled to the decomposition unit and the standard-definition encoder for encoding only the difference between the high-definition data and the standard-definition data as user data embodying a high-definition data sequence.

These and other aspects, features and advantages of the present invention will become apparent from the following description of exemplary embodiments, which is to be read in connection with the accompanying drawings.

BRIEF DESCRIPTION OF THE DRAWINGS

The present invention utilizes hybrid interleaving video CODECs for integrating standard-definition ("SD") with high-definition ("HD") on a single digital videodisc ("DVD") in accordance with the following exemplary figures, in which:

FIG. 2 shows a schematic data structure for two program chains in accordance with the principles of the present invention;

FIG. 3 shows a schematic data structure for presentation of interleaved units in accordance with the principles of the present invention;

FIG. 4 shows a table of the video data in a video object unit in accordance with the principles of the present invention;

DETAILED DESCRIPTION OF PREFERRED EMBODIMENTS

Figure 1:
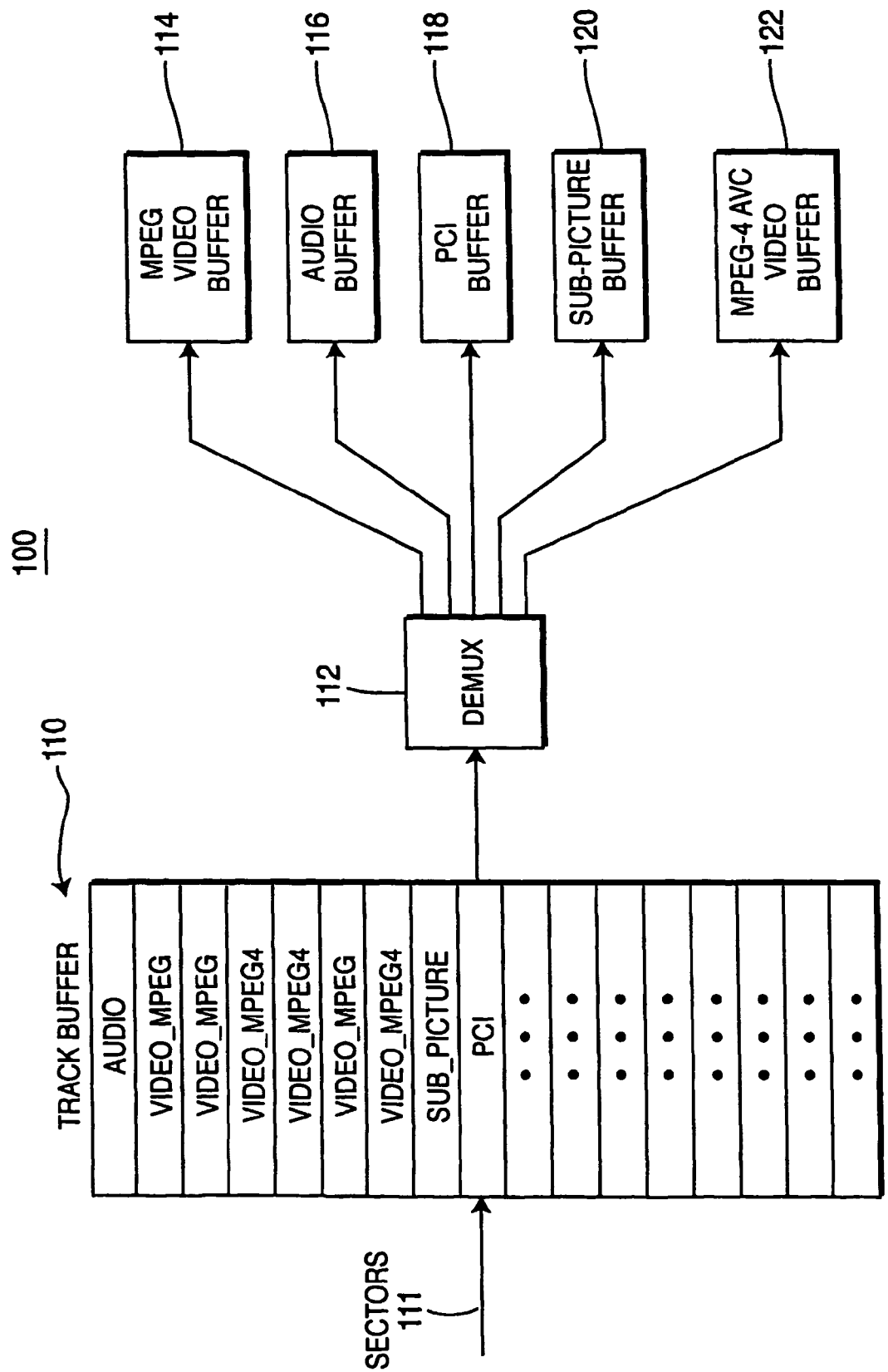
FIG. 1 shows a schematic data structure for a hybrid DVD player in accordance with the principles of the present invention.

The present invention provides for both standard-definition ("SD") and high-definition ("HD") versions of a movie, for example, suitable for storage on a single red-laser disc. The approach is that of providing single-disc SD and HD using MPEG-2 for the SD data and MPEG-4 AVC (also known as JVT, MPEG-4 Part 10, or AVC) stored as user data of the base layer for the difference between the SD data and the HD data. A first exemplary embodiment of the approach supports a total peak bitrate up to about 9.8 Mbps on a single-sided red-laser videodisc, for example. Alternate embodiments may be used to support higher bitrates. A second exemplary embodiment supports higher bitrates for high-bandwidth segments while continuing to provide single-disc SD and HD by using a hybrid interleaved approach with MPEG-2 for the SD data and MPEG-4 AVC for the HD data in such high-bandwidth segments.

For storing SD and HD on one disc, the approach of storing the HD difference data as base layer user data is described, with or without optional interleaving for high-bandwidth segments. Due to the storage capacity constraint with red laser DVD, MPEG-2 is not sufficient for the HD layer. Embodiments of the present invention store hybrid encoding data on DVD discs that can be played back by current DVD players. Two exemplary embodiments are described. The user data approach saves the higher layer data as user data of the base layer, and the interleaving approach stores base layer and enhancement layer data in an interleaved data structure for high-bandwidth video segments. Thus, these and other embodiments allow two versions of a movie, one standard definition and one high definition, to be stored on a single DVD disc.

The hybrid high-definition DVD has two layers. The base layer is MPEG2, and the enhancement layer is MPEG-4 AVC (or JVT). These two layers can be interleaved such that current generation SD DVD players can play back the base layer MPEG2 stream, and the hybrid HD DVD player can play back both layers. Thus, such DVD discs are backward compatible.

Of the two exemplary embodiments, the first saves enhancement layer data as user data of the base layer. To do that, the current DVD authoring tools can be used to author the hybrid DVD disc without any significant changes.

The second exemplary embodiment uses interleaving blocks for high-bandwidth segments in combination with the user data approach of the first embodiment for lower bandwidth segments. Two video objects ("VOBs") and two program chains ("PGCs") are created, one for the base layer and the other for the enhancement layer. Current authoring tools should be modified to accommodate these changes.

For the first embodiment, where MPEG-4 AVC data is to be saved as MPEG2 picture user data, the enhancement layer data can be saved as GOP user data or picture user data. Because GOP user data is used for closed captioning in DVD, the picture user data is the preferred modality to store the enhancement layer data. The picture user data will not be decoded when the disc is played on current SD DVD players.

As shown in FIG. 1, a buffer arrangement 100 can be used on current DVD players with one track buffer 110 and four secondary buffers 114-120. The video data is demultiplexed with a demultiplexor 112, and transferred to an MPEG video buffer 114, where the user data will be processed or skipped over. The new hybrid HD DVD player has at least one additional buffer 122, an MPEG-4 AVC Video Buffer. The enhancement layer data is demultiplexed and sent to this buffer 122 for decoding. The data stored in the track buffer 110 is stored sector by sector 111, so the enhancement layer data is sector aligned.

Turning to FIG. 2, an interleaved data structure for two PGCs is indicated generally by the reference numeral 200. Here, an interleaved block 210 includes interleaving more than one VOB 212, 214 to enable seamless presentation of more than one path. Each VOB is divided into the same number of interleaved units ("ILVUs") 213, 215, respectively. By appropriately setting the size of the interleaved units, the time needed for jumping may be kept within the value permitted, and seamless playback can be realized.

As shown in FIG. 3, an ILVU includes one or more VOBUs. In this exemplary embodiment, each ILVU has one or two VOBUs. The presentation of ILVUs is indicated generally by the reference numeral 300. The ILVUs 310 belong to an enhancement layer PGC while the other ILVUs 312 belong to a base layer PGC.

The playback time of an ILVU is about 1.0 second in this exemplary embodiment. The exemplary maximum jump distance is 660 sectors. If the base layer is ⅓ of the data, then it has 220 sectors, and the enhancement layer ILVU has 440 sectors. On average, the jump distance is 440 sectors, which guarantees seamless playback.

The preferred identifications in video management information ("VMGI") and in video title set information (VTSI) to help a player to recognize the disc type are:

VMGI—VMGI_MAT: Bytes 16-27: reserved to "MPEG2AVC-VMG"

VTSI—VTSI_MAT: Bytes 16-27: reserved to "MPEG2AVC-VTS"

Turning now to FIG. 4, the video data in a video object unit ("VOBU") can be organized as shown in the table 400. Thus, a picture has three types of data, and they are each sector aligned: 1. picture header without including picture user data; 2. picture user data; and 3. picture data.

The second exemplary embodiment uses interleaving blocks to interleave the two layers. Two program chains ("PGCs") are created, one for the base layer and the other for the high or enhancement layer. Here, the first VOB is used for the MPEG2 base layer, and the other is used for the MPEG-4 AVC enhancement layer. The base layer and enhancement layer are not in the same VOBU, but are interleaved. To avoid playback of the second PGC, the second PGC is not assigned an entry point. The hybrid HD DVD player merges these two PGCs after it recognizes a hybrid HD DVD disc.

Figure 5:
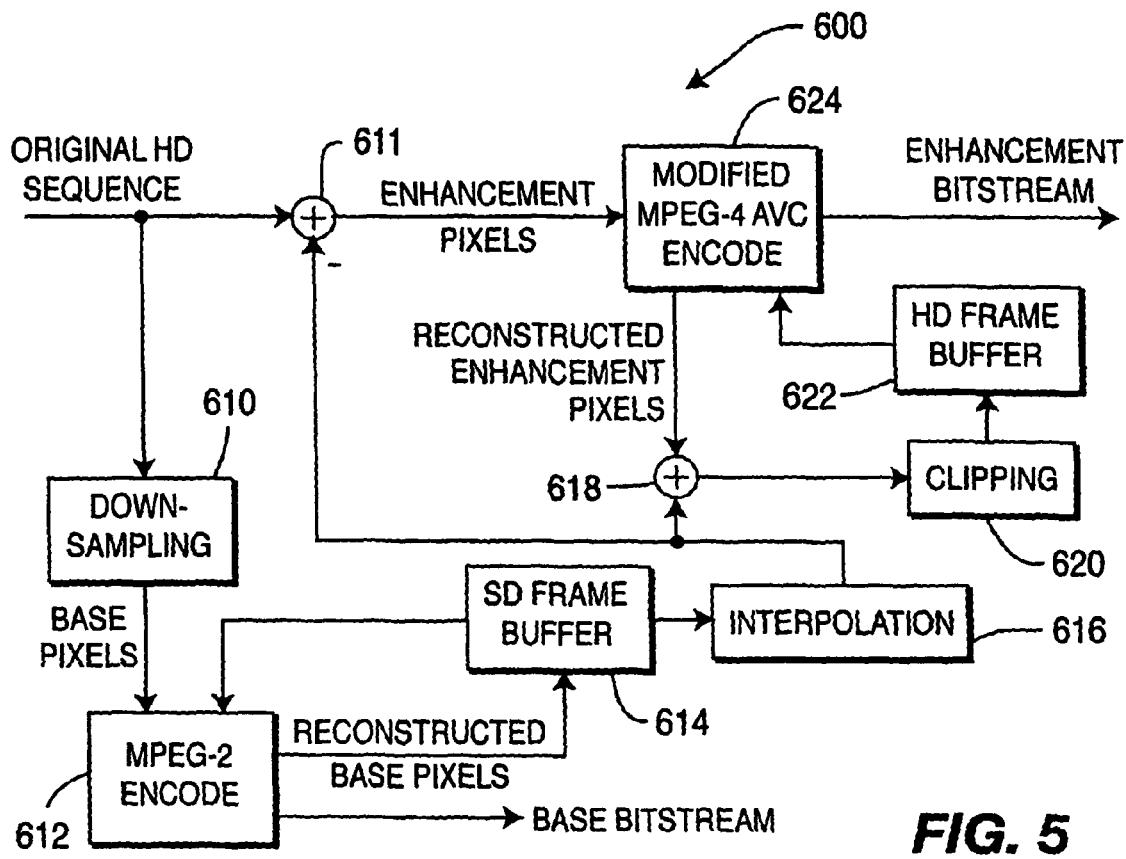
FIG. 5 shows a block diagram for another hybrid interleaved encoder in accordance with the principles of the present invention.

As shown in FIG. 5, a hybrid interleaving encoder is indicated generally by the reference numeral 600. The encoder includes a downsampling unit 610 for receiving an original HD sequence and downsampling to provide Base layer pixels. The encoder 600 also includes a first summing block 611 for receiving the original HD sequence at a non-inverting input. The downsampling unit 610 is coupled in signal communication with an MPEG-2 encoder 612 that receives the Base layer pixels from the downsampling unit and provides a Base layer bitstream output. The MPEG-2 encoder 612 is coupled to an SD frame buffer 614 and provides reconstructed base pixels to the buffer 614. The buffer 614 is coupled in feedback signal communication with the encoder 612, and is further coupled to an interpolator 616. The interpolator 616 is coupled to an inverting input of the first summing block 611. The interpolator 616 is further coupled to a first input of a second summing block 618, which has its output coupled to a clipper 620. The clipper 620, in turn, is coupled to an HD frame buffer 622, which is coupled to a modified MPEG-4 AVC encoder 624. The encoder 624 has an input coupled to the output of the first summing block 611 for receiving Enhancement layer pixels, and an output coupled to a second input of the second summing block 618 for providing reconstructed Enhancement layer pixels to the second summing block 618. The encoder 624 provides an Enhancement layer bitstream output.

Figure 6:
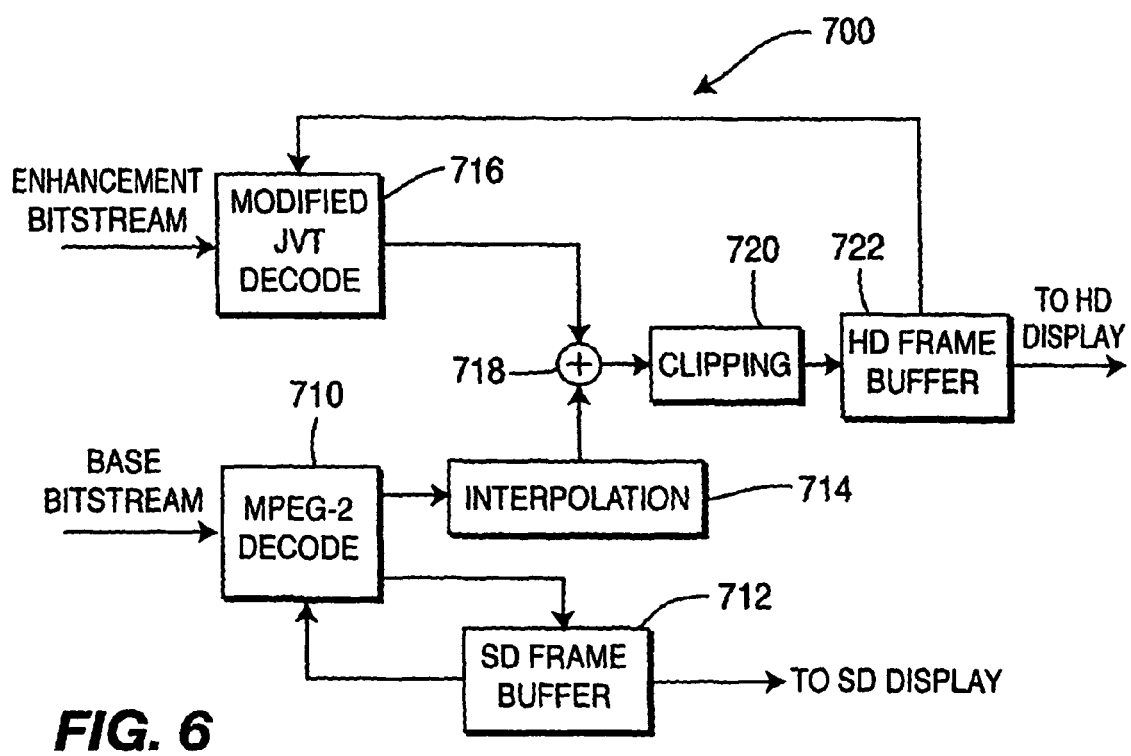
FIG. 6 shows a block diagram for a hybrid interleaved decoder in accordance with the principles of the present invention.

Turning to FIG. 6, a hybrid interleaving decoder is indicated generally by the reference numeral 700. The decoder 700 includes an MPEG-2 decoder 710 for receiving a Base layer bitstream. The MPEG-2 decoder is coupled to an SD frame buffer 712 for buffering the standard-definition frames. The SD frame buffer 712 provides an output suitable for an SD display, and is coupled back to the MPEG-2 decoder 710. The MPEG-2 decoder is further coupled to an interpolator 714, which is coupled, in turn, to a non-inverting input of a two-layer composition unit or summing block 718. The hybrid interleaved decoder 700 further includes a modified JVT decoder 716 for receiving an Enhancement layer bitstream. The modified JVT decoder is coupled to a second non-inverting input of the summing block 718. The output of the summing block 718 is coupled to a clipping unit 720, which is coupled, in turn, to an HD frame buffer 722. The HD frame buffer 722 provides an output suitable for an HD display, and is also coupled back to the modified JVT decoder 716. In operation, the exemplary hybrid interleaving scheme uses MPEG-2 encoding for the base layer and modified MPEG-4 AVC encoding for the enhancement layer. In one exemplary system, the resolution for the HD layer is 1280×720, and the SD layer is 704×480.

In operation, FIG. 5 shows a high-level block diagram of the hybrid interleaving encoder. First, the original HD material is decomposed into a base layer containing the low frequency content and an enhancement layer containing the high frequency content of the original sequence. The base layer is encoded using MPEG-2 and the enhancement layer is encoded using a modified version of MPEG-4 AVC. The base and enhancement bitstreams are recorded on the disc in an interleaved fashion. The reconstructed HD frames are obtained by interpolating the reconstructed base layer pixels and adding the result to the reconstructed enhancement layer pixels.

The hybrid interleaving decoder includes an MPEG-2 decoder, a modified MPEG-4 AVC decoder, and an interpolator for the base layer. The output of the interpolator and the MPEG-4 AVC decoder are summed to give the reconstructed HD frames.

Referring back to FIG. 5, the enhancement layer pixels are reconstructed and added to the interpolated reconstructed base layer pixels to form the reconstructed HD frames. These reconstructed HD frames are used as reference frames for coding of future enhancement layer data.

Interleaving of bitstreams on disc may be accomplished as follows. The standard-definition data is stored in the base stream, and the high-definition enhancement data is stored as user data of the base stream. Only the standard-definition data would be playable by pre-existing DVD players. The current DVD standard specifies constraints for seamless branching (for example, maximum jump sectors, minimum buffer sectors) that, if met, should ensure seamless playback on such pre-existing players.

In accordance with the principles of the present invention, the disclosed CODEC provides the ability to decode two bitstreams from a single disc at the same time to obtain the HD version, or to decode a single bitstream to obtain the SD version. New players will play a disc with a non-interleaved MPEG-4 AVC stream, in addition to the interleaved streams. Embodiments of the present invention may encourage content creators, video stores and consumers to build up stocks of HD material before the new HD players have reached an installed quantity that would justify creating, selling and buying HD-only discs.

Thus, embodiments of the present invention allow two versions of a movie, one standard-definition ("SD") and one high-definition ("HD"), to be read from a dual-layer, single-sided, red laser DVD disc without the need to store the information included in the SD version a second time as part of the HD version. The coding is done using a hybrid MPEG-2 and MPEG-4 AVC interleaving. The use of MPEG-2 for the base layer provides an SD bitstream that can be played by a current SD DVD player. The enhancement layer is coded using an MPEG-4 AVC scheme to provide the coding efficiency needed to put both the SD and HD content on a single disc. The present invention may also be applied to streaming and/or volatile content, such as, for example, streaming Internet video, in addition to DVD media. Although described in a manner in which the standard-definition version is encoded in MPEG-2 format and the high-definition format is encoded in MPEG-4 AVC format, it would be apparent to those skilled in the art that the invention equally applies if standard formatting other than those formats are used, and the claims are to be construed as also including formats other than MPEG-2 and MPEG-4 AVC. Similarly, although described as being encoded on a DVD, it would be apparent to those skilled in the art that the invention equally applies to optical disc formats other than DVD; and that claims that recite incorporation of a digital videodisc are intended to include other optical disc formats other than a DVD.

This exemplary description merely illustrates the principles of the invention. It will thus be appreciated that those skilled in the art will be able to devise various arrangements, which, although not explicitly described or shown herein, embody the principles of the invention, and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures, (including functional blocks) may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually where the particular technique being selectable by the implementer is more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means that can provide those functionalities as equivalent to those shown herein.

These and other features and advantages of the present invention may be readily ascertained by one of ordinary skill in the pertinent art based on the teachings herein. It is to be understood that the principles of the present invention may be implemented in various forms of hardware, software, firmware, special purpose processors, or combinations thereof.

Most preferably, the principles of the present invention may be implemented in a combination of hardware and software. Moreover, the software may be implemented as an application program tangibly embodied on a program storage unit. The application program may be uploaded to, and executed by, a machine comprising any suitable architecture. The machine may be implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the principles described herein, one of ordinary skill in the pertinent art will be able to contemplate these and similar implementations or configurations of the present invention without departing from the spirit and scope of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

The invention claimed is:

1. An encoder for encoding signal data as a plurality of block transform coefficients for each of base layer data and enhancement layer data, the encoder comprising:
   a two-layer decomposition unit for decomposing an original high-definition signal data sequence into base layer data and enhancement layer data;
   a standard-definition encoder coupled to the decomposition unit for encoding the base layer data as a base layer bitstream embodying a standard-definition data sequence; and
   a high-definition encoder coupled to the decomposition unit and the standard-definition encoder for encoding only the difference between the high-definition data and the standard-definition data as base layer user data embodying a high-definition data sequence,
   wherein at least a portion of the difference between the high-definition data and the standard-definition data encoded as the base layer user data embodying the high-definition data sequence comprises video pixel data.

2. An encoder as defined in claim 1 wherein the enhancement layer data is interleaved with the base layer data for at least one segment.

3. An encoder as defined in claim 2 wherein the enhancement layer data is interleaved with the base layer data for each segment having a bandwidth greater than about 9.8 Mbps.

4. An encoder as defined in claim 1 wherein the decomposition unit comprises a downsampling unit.

5. An encoder as defined in claim 1 wherein the signal data comprises video pixel data.

6. An encoder as defined in claim 1 wherein the standard-definition encoder meets an MPEG-2 standard.

7. An encoder as defined in claim 1 wherein the high-definition encoder meets an MPEG-4 AVC standard.

8. An encoder as defined in claim 1, further comprising a standard-definition frame buffer in signal communication with the standard-definition encoder for maintaining reconstructed base layer data.

9. An encoder as defined in claim 1, further comprising a high-definition frame buffer in signal communication with the high-definition encoder for maintaining reconstructed enhancement layer data.

10. An encoder as defined in claim 1, further comprising an interpolation unit coupled between the standard-definition encoder and the high-definition encoder for interpolating the standard-definition data into a format corresponding to the high-definition data.

11. An encoder as defined in claim 1 wherein the base layer user data embodying the high-definition data sequence comprises base layer Group Of Pictures user data.

12. An encoder as defined in claim 1 wherein the base layer user data embodying the high-definition data sequence comprises base layer picture user data.

13. An encoder for encoding signal data as a plurality of block transform coefficients for each of base layer data and enhancement layer data, the encoder comprising:
   receiver means for receiving an original high-definition signal data sequence;
   decomposition means for decomposing the original high-definition signal data sequence into base layer data and enhancement layer data;
   base layer encoding means for encoding the base layer data as a base layer bitstream embodying a standard-definition data sequence; and
   enhancement layer encoding means for encoding only the difference between the high-definition data and the standard-definition data as base layer user data embodying a high-definition data sequence, wherein at least a portion of the difference between the high-definition data and the standard-definition data encoded as the base layer user data embodying the high-definition data sequence comprises video pixel data.

14. In a video encoder, a method for encoding signal data as a plurality of block transform coefficients for each of base layer data and enhancement layer data, the method comprising:
   receiving an original high-definition signal data sequence;
   decomposing the original high-definition signal data sequence into base layer data and enhancement layer data;

encoding the base layer data as a base layer bitstream embodying a standard-definition data sequence; and encoding only the difference between the high-definition data and the standard-definition data as base layer user data embodying a high-definition data sequence, wherein at least a portion of the difference between the high-definition data and the standard-definition data encoded as the base layer user data embodying the high-definition data sequence comprises video pixel data.

15. A method as defined in claim 14 wherein the enhancement layer data is interleaved with the base layer data for at least one segment.

16. A method as defined in claim 14 wherein the enhancement layer data is interleaved with the base layer data for each segment having a bandwidth greater than about 9.8 Mbps.

17. A method as defined in claim 14 wherein the signal data comprises video pixel data.

18. A method as defined in claim 14 wherein the base layer bitstream meets an MPEG-2 standard.

19. A method as defined in claim 14 wherein the base layer bitstream embodying the standard-definition data sequence and the picture base layer user data embodying the high-definition data sequence are authored using digital videodisc authoring tools.

20. A method as defined in claim 14, further comprising interpolating the standard-definition data into a format corresponding to the high-definition data.

21. A method as defined in claim 14 wherein the base layer user data embodying the high-definition data sequence comprises base layer Group Of Pictures user data.

22. A method as defined in claim 14 wherein the base layer user data embodying the high-definition data sequence comprises base layer picture user data.

\* \* \* \* \*